(12) United States Patent
Guest et al.

(10) Patent No.: US 8,684,075 B2
(45) Date of Patent: Apr. 1, 2014

(54) SAND SCREEN, EXPANDABLE SCREEN AND METHOD OF MAKING

(75) Inventors: Randall V. Guest, Spring, TX (US);
Michael H. Johnson, Katy, TX (US);
Kirk J. Huber, Magnolia, TX (US)

(73) Assignee: Baker Hughes Incorporated, Houston, TX (US)

( * ) Notice: Subject to any disclaimer, the term of this patent is extended or adjusted under 35 U.S.C. 154(b) by 385 days.

(21) Appl. No.: 13/029,773

(22) Filed: Feb. 17, 2011

(65) Prior Publication Data

US 2012/0211223 A1     Aug. 23, 2012

(51) Int. Cl.
*E03B 3/18* (2006.01)

(52) U.S. Cl.
USPC .......................................... 166/230; 166/207

(58) Field of Classification Search
USPC .......... 166/207, 227, 230, 228; 138/114, 206, 138/405
See application file for complete search history.

(56) References Cited

U.S. PATENT DOCUMENTS

| | | | |
|---|---|---|---|
| 1,352,493 A | 9/1920 | Wolffgram | |
| 3,089,187 A | 5/1963 | Wolfe | |
| 3,099,318 A | 7/1963 | Miller et al. | |
| 3,205,289 A | 9/1965 | Carpenter | |
| 3,371,793 A | 3/1968 | Fowler | |
| 3,566,653 A | 3/1971 | Unrath | |
| 3,695,076 A | 10/1972 | Kocks | |
| 3,892,832 A | 7/1975 | Schey | |
| 3,933,557 A | 1/1976 | Pall | |
| 4,214,612 A | 7/1980 | de Putter | |
| 4,260,096 A | 4/1981 | Samarynov et al. | |
| 4,358,064 A | 11/1982 | Garneau | |
| 4,363,845 A | 12/1982 | Hartmann | |
| 4,474,845 A | 10/1984 | Hagerman et al. | |
| 4,518,340 A | 5/1985 | Jakobsen et al. | |
| 4,545,947 A | 10/1985 | Bozoarth et al. | |
| 4,577,481 A | 3/1986 | Staat | |
| 4,592,782 A | 6/1986 | Davies | |
| 4,621,999 A | 11/1986 | Gerhardt | |
| 4,807,525 A | 2/1989 | de Brock | |
| 4,816,106 A | 3/1989 | Turris et al. | |
| 4,924,568 A | 5/1990 | Sato et al. | |
| 4,976,915 A | 12/1990 | Kuroki | |
| 5,032,622 A | 7/1991 | Herrington et al. | |
| 5,049,591 A | 9/1991 | Hayashi et al. | |

(Continued)

FOREIGN PATENT DOCUMENTS

| | | |
|---|---|---|
| EP | 0177167 A1 | 4/1986 |
| JP | 06-047219 A | 2/1994 |

(Continued)

OTHER PUBLICATIONS

Notification of Transmittal of the International Search Report and the Written Opinion of the International Searching Authority, PCT/US2011/031768; Mailed Sep. 30, 2011; Korean Intellectual Property Office.

(Continued)

*Primary Examiner* — Cathleen Hutchins
(74) *Attorney, Agent, or Firm* — Cantor Colburn LLP

(57) ABSTRACT

An expandable screen includes, a body constructed of one or more strands of a shape memory material randomly distributed in a mat structure, the body is stable at a first volume and expandable to a second volume upon a change in environment.

19 Claims, 1 Drawing Sheet

(56) References Cited

U.S. PATENT DOCUMENTS

| | | | |
|---|---|---|---|
| 5,098,776 | A | 3/1992 | Kobayashi et al. |
| 5,120,380 | A | 6/1992 | Strachan |
| 5,207,960 | A | 5/1993 | Moret de Rocheprise |
| 5,230,726 | A | 7/1993 | Smith et al. |
| 5,242,651 | A | 9/1993 | Brayden et al. |
| 5,324,117 | A | 6/1994 | Matsushita et al. |
| 5,429,847 | A | 7/1995 | Ando et al. |
| 5,501,832 | A | 3/1996 | Adams |
| 5,503,784 | A | 4/1996 | Balk |
| 5,520,758 | A | 5/1996 | Kelman et al. |
| 5,533,370 | A | 7/1996 | Kuroda et al. |
| 5,565,049 | A | 10/1996 | Simmons et al. |
| 5,770,016 | A | 6/1998 | Greve |
| 5,964,798 | A | 10/1999 | Imran |
| 6,281,289 | B1 | 8/2001 | Maugans et al. |
| 6,302,676 | B1 | 10/2001 | Kato et al. |
| 6,321,503 | B1 | 11/2001 | Warren |
| 6,342,283 | B1 | 1/2002 | Mozelack et al. |
| 6,388,043 | B1 | 5/2002 | Langer et al. |
| 6,472,449 | B1 | 10/2002 | Heinemann et al. |
| 6,521,555 | B1 | 2/2003 | Bodaghi et al. |
| 6,560,942 | B2 | 5/2003 | Warren et al. |
| 6,583,194 | B2 | 6/2003 | Sendijarevic |
| 6,769,484 | B2 | 8/2004 | Longmore |
| 6,817,441 | B2 | 11/2004 | Murakami et al. |
| 6,827,764 | B2 | 12/2004 | Springett et al. |
| 6,935,432 | B2 | 8/2005 | Nguyen |
| 6,983,796 | B2 | 1/2006 | Bayne et al. |
| 6,986,855 | B1 | 1/2006 | Hood et al. |
| 7,048,048 | B2 | 5/2006 | Nguyen et al. |
| 7,134,501 | B2 | 11/2006 | Johnson et al. |
| 7,155,872 | B2 | 1/2007 | Francom |
| 7,234,518 | B2 | 6/2007 | Smith |
| 7,552,767 | B2 | 6/2009 | Wood |
| 7,644,773 | B2 | 1/2010 | Richard |
| 7,677,321 | B2 | 3/2010 | Spray |
| 7,712,529 | B2 | 5/2010 | Dusterhoft et al. |
| 7,743,835 | B2 | 6/2010 | Willauer |
| 7,828,055 | B2 | 11/2010 | Willauer et al. |
| 2002/0144822 | A1* | 10/2002 | Hackworth et al. ......... 166/380 |
| 2003/0213380 | A1 | 11/2003 | Sebastian et al. |
| 2004/0241410 | A1 | 12/2004 | Fischer et al. |
| 2005/0056425 | A1 | 3/2005 | Grigsby et al. |
| 2005/0126699 | A1 | 6/2005 | Yen et al. |
| 2005/0173130 | A1 | 8/2005 | Richard |
| 2005/0205263 | A1 | 9/2005 | Richard |
| 2005/0272211 | A1 | 12/2005 | Browne et al. |
| 2006/0228963 | A1 | 10/2006 | Souther et al. |
| 2007/0044891 | A1 | 3/2007 | Sellars et al. |
| 2007/0211970 | A1 | 9/2007 | Nagata et al. |
| 2008/0006413 | A1 | 1/2008 | Le Gloahec et al. |
| 2008/0296020 | A1 | 12/2008 | Willauer |
| 2008/0296023 | A1 | 12/2008 | Willauer |
| 2009/0252926 | A1 | 10/2009 | Henderson et al. |
| 2009/0301635 | A1 | 12/2009 | Corre et al. |
| 2009/0319034 | A1 | 12/2009 | Sowinski |
| 2010/0038076 | A1 | 2/2010 | Spray et al. |
| 2010/0144247 | A1 | 6/2010 | Lunn et al. |
| 2011/0178237 | A1 | 7/2011 | Ono et al. |

FOREIGN PATENT DOCUMENTS

| | | | |
|---|---|---|---|
| JP | 6-210318 | | 8/1994 |
| JP | 6210309 A | | 8/1994 |
| JP | 3279962 B2 | | 4/2002 |
| WO | 2004099560 A1 | | 11/2004 |
| WO | WO2007/106429 | * | 9/2007 .............. E21B 43/14 |

OTHER PUBLICATIONS

G. Scott Lester et al., "Field Application of a New Cleanable and Damage Tolerant Downhole Screen,"; Society of Petroleum Engineers, SPE Paper No. 30132, May 15, 1995.

Jiaxing (Jason) Ren et al., "Studying the Effect of Chemical Aging on the Properties of a Shape Memory Material", Offshore Technology Conference, Paper No. OTC 21317; May 2, 2011.

Witold M. Sokolowski et al., "Cold hibernated elastic memor(yC HEM) self-deployable structures"; Jet Propulsion Laboratory, California Institute of Technology, Mar. 1, 1999.

Notification of Transmittal of the International Search Report and the Written Opinion of the International Searching Authority; PCT/US2012/021273; Korean Intellectual Property Office; Mailed Sep. 26, 2012; 8 pages.

Notification of Transmittal of the International Search Report and the Written Opinion of the International Searching Authority; PCT/US2012/041239; Mailed Jan. 2, 2013; Korean Intellectual Property Office; 9 pages.

Notification of Transmittal of the International Search Report and the Written Opinion of the International Searching Authority; PCT/US2012/048795; Mailed Feb. 14, 2013; Korean Intellectual Property Office; 10 pages.

Notification of Transmittal of the International Search Report and the Written Opinion of the International Searching Authority; PCT/US2012/048796; Mailed Feb. 8, 2013, Korean Intellectual Property Office; 6 pages.

Notification of Transmittal of the International Search Report and the Written opinion of the International Searching Authority; PCT/US2012/048798; Mailed Feb. 20, 2013, Korean Intellectual Property Office; 8 pages.

SPE Distinguished Lecturer Series[online]; retrieved on Sep. 25, 2009]; retrieved from the Internet at: http://www.spe.org/spe-site/spe/spe/events/dl/Ott.pdf.

Lorrie A. Krebs et al., "Pitting Resistance of Nitinol Stents Before and After Implantation"; NACE International; Paper No. 09461; Corrosion Conference and Expo Mar. 22-26, 2009.

C.F. Williams et al., "A New Sizing Criterion for Conformable and Nonconformable Sand Screens Based on Uniform Pore Structures"; Society of Petroleum Engineers, SPE Paper No. 98235; Feb. 15-17, 2006.

J. Heiland et al., "The Role of the Annular Gap in Expandable Sand Screen Completions"; Society of Petroleum Engineers; SPE Paper No. 86463; Feb. 18-20, 2004.

International Search Report and Written Opinion, International Application No. PCT/US2012/021274, Date of Mailing Aug. 17, 2012, Korean Intellectual Property Office, International Search report 5 pages, Written Opinion 7 pages.

* cited by examiner

SAND SCREEN, EXPANDABLE SCREEN AND METHOD OF MAKING

BACKGROUND

Filtering contaminates from flowing fluids is a common exercise in systems involved in transportation of fluids. Many such systems employ screens as the filtering mechanism. Screens that expand to substantially fill an annular gap, for example, between concentric tubulars, is another common practice. Some of these systems use swaging equipment to radially expand the screen. Although such equipment serves its purpose it has limitations, including a limited amount of potential expansion, complex and costly equipment and an inability to expand to fill a nonsymmetrical space. Apparatuses that overcome these and other limitations with existing systems are therefore desirable to operators in the field.

BRIEF DESCRIPTION

Disclosed herein is an expandable screen. The expandable screen includes, a body constructed of one or more strands of a shape memory material randomly distributed in a mat structure, the body is stable at a first volume and expandable to a second volume upon a change in environment.

Further disclosed herein is a method of making an expandable screen. The method includes, extruding one or more strands of a shape memory material, building a body having a mat structure with multiple layers of the one or more strands randomly positioned and stacked against one another, compacting the body, and cooling the body.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
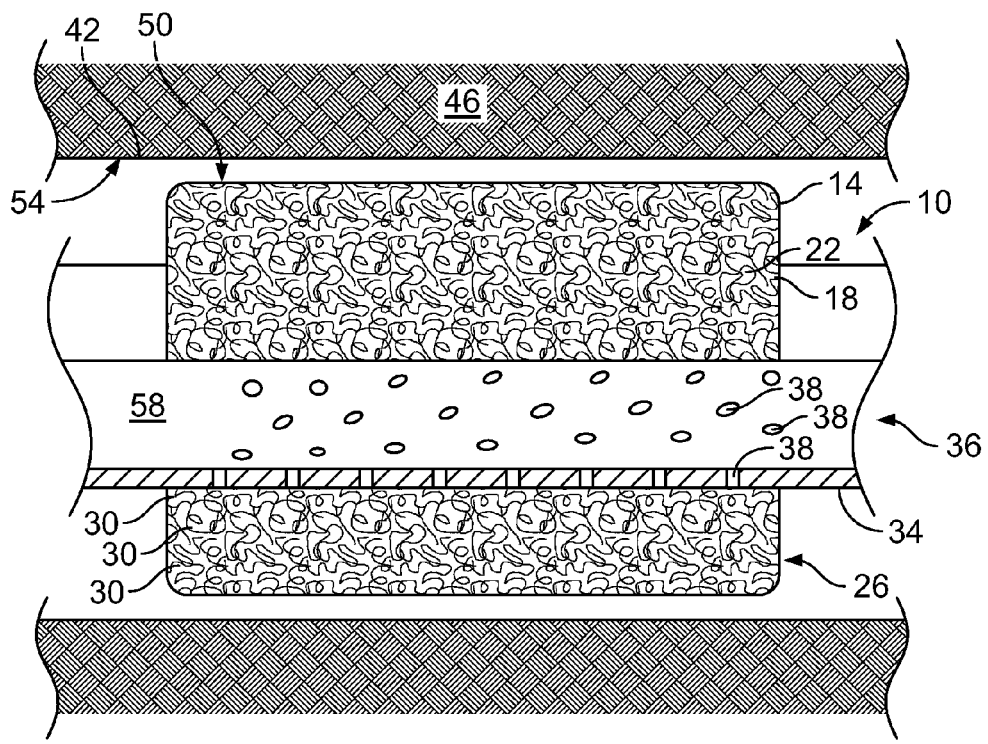
FIG. 1 depicts a quarter cross sectional view of an expandable screen disclosed herein employed in a sand screen application.

Referring to FIG. 1, an embodiment of an expandable screen disclosed herein is illustrated generally at 10. The expandable screen 10 includes a body 14 with one or more strands 18 of a shape memory material 22 distributed in a mat structure 26. The body 14 is stable at a first volume (as illustrated in FIG. 1) and is expandable to a second volume that is greater than the first volume. Changes in the environment of the body 14 drive the change from the first volume to the second volume. In this embodiment, the change in environment is an increase in temperature. Other effective changes may be surrounding fluid, magnetic field, or the like.

The body 14 illustrated in this embodiment is formed by extruding the strands 18 of the shape memory material 22 and building the mat structure 26 layer 30 by layer 30 with random positioning of each new strand 18 over the strands 18 already positioned. It should be noted that the term layer 30 is used loosely to explain that each new strand 18 is applied over older strands 18 and not to imply that each layer 30 is actually separated and definable relative to each other of the layers 30. The strands 18 are at an elevated temperature while extruding resulting in at least entanglement and possibly intermittent bonding of the strands 18 to one another wherever they happen to be in contact during the extruding and mat forming process. The mat structured body 14, upon completion of the manufacturing process, is in the second volume configuration. The body 14 can then be compacted to the configuration of the first volume where it is cooled thereby forming the body 14 into a stable first volume configuration. The stability of the body 14 in the first volume can be maintained until the body 14 is heated to a temperature wherein the shape memory material changes shape, at which time the body 14 will begin changing toward the second volume.

In FIG. 1 the embodiment of the expandable screen 10, as illustrated, is employed in a sand screen 36 application for a downhole hydrocarbon recovery application. The body 14 has a cylindrical shape and is positioned radially outwardly of a base pipe 34 that has holes 38 therethrough and illustrated herein as a perforated tubular. The body 14 and the base pipe 34 are assembled and positioned within a borehole 42 in an earth formation 46. The body 14, as illustrated in the Figure, is in the first position, which is also known as the run in position, wherein an outer surface 50 of the body 14 is dimensioned radially smaller than a radial dimension of an inner surface 54 of the borehole 42. Once the body 14 and base pipe 34 assembly are run into the borehole 42 and positioned at a desired location, the body 14 can be heated to a temperature wherein the shape memory material changes shape, thereby expanding the body 14 towards the second volume. The body 14 may not reach the second volume since contact with the inner surface 54 may prevent the volumetric expansion of the body 14 from continuing. Such contact is desirable since it maintains the structure of the formation 46 and minimizes erosion thereof, while allowing fluid to flow through the formation 46 and be filtered by the screen 10 before flowing through the holes 38 and into the inside 58 of the base pipe 34.

The shape memory material 22, as illustrated in this embodiment, may be a metal such as Nitinol, which is an equiatomic alloy of nickel and titanium that has the symbol NiTi, while in other embodiments the shape memory material 22 may be nonmetallic, such a polymeric, for example. NiTi shape memory metal alloy can exist in two different temperature-dependent crystal structures (phases) called martensite (lower temperature) and austenite (higher temperature or parent phase). Several properties of austenite NiTi and martensite NiTi are notably different. When martensite NiTi is heated, it begins to change into austenite. The temperature at which this phenomenon starts is called austenite start temperature ($A_s$). The temperature at which this phenomenon is complete is called austenite finish temperature ($A_f$). When austenite NiTi is cooled, it begins to change into martensite. The temperature at which this phenomenon starts is called martensite start temperature ($M_s$). The temperature at which martensite is again completely reverted is called martensite finish temperature ($M_f$).

The body 14 in the first volume, as formed in this embodiment, is in the austenitic form. It is then deformed to the new second volume at a temperature under $M_f$. The body 14 in this second volume is dimensioned to have clearance relative to the inner surface 54 for running into the borehole 42. The temperature is then raised above the transition temperature ($A_s$), and the body begins to expand towards the second volume.

Filtration characteristics of the screen 10 will depend upon several factors. For example, the dimensions of the strands 18, the complexity of the mat structure 26 and the amount of compaction as deployed. The dimensions of the strands 18 and the complexity of the mat structure 26 are both controllable in the manufacturing process. Additionally, the amount of compaction as deployed can be estimated based on knowledge of the dimensions of the inner surface 54 relative to the dimensions of the base pipe 34 and the body 14 positioned thereon when in the first volume configuration.

Figure 2:
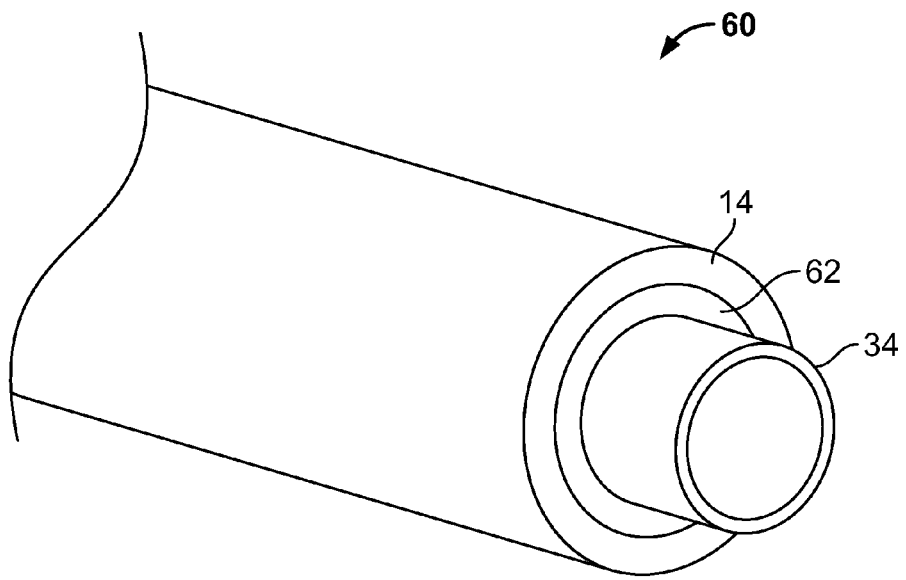
FIG. 2 depicts a partial perspective view of the expandable screen of FIG. 1 shown in an alternate sand screen application.

Referring to FIG. 2, an alternate embodiment of a sand screen disclosed herein is illustrated at 60. The sand screen 60 allows for additional control over final filtration properties in comparison to that of the sand screen 36 by positioning the body 14 concentrically radially outwardly of a separate filter component 62. As such, by setting the filtration properties of the filter component 62 finer than those of the body 14 the final filtration properties are established based primarily upon those of the filter component 62. Additionally the filter component 62 could be made of a material that does not expand, thereby avoiding changes in filtration properties that result from expansion had the filter component 62 been configured to expand.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

The invention claimed is:

1. An expandable screen comprising a body constructed of one or more strands of a shape memory material randomly distributed in a mat structure, the body being stable at a first volume and expandable to a second volume upon a change in environment.

2. The expandable screen of claim 1, wherein the change in environment is a change in the temperature.

3. The expandable screen of claim 2, wherein the shape memory material is metal.

4. The expandable screen of claim 2 wherein the shape memory material is an alloy of nickel and titanium.

5. The expandable screen of claim 4, wherein the alloy of nickel and titanium has a martensite structure when in the first volume.

6. The expandable screen of claim 4, wherein the alloy of nickel and titanium has an austenite structure when in the second volume.

7. The expandable screen of claim 1, wherein the body is a tubular.

8. The expandable screen of claim 1, wherein the body filters fluid that passes therethrough.

9. The expandable screen of claim 1, wherein the body is configured to fill an annular space when expanded toward the second volume.

10. The expandable screen of claim 1, wherein the body is compacted to the first volume at a temperature below which the shape memory material expands.

11. The expandable screen of claim 2 wherein the shape memory material is a shape memory polymer.

12. A sand screen apparatus comprising:
   a tubular; and
   a body according to claim 1 in operable communication with the tubular positioned radially of the tubular.

13. The sand screen apparatus of claim 12, wherein the tubular is perforated.

14. The sand screen apparatus of claim 13, further comprising a filter component positioned radially of the body.

15. The sand screen apparatus of claim 14, wherein the filter component is configured to not expand.

16. The sand screen apparatus of claim 14, wherein the filter component has finer filtration properties than the body.

17. A method of making an expandable screen, comprising:
   extruding one or more strands of a shape memory material;
   building a body having a mat structure with multiple layers of the one or more strands randomly positioned and stacked against one another;
   compacting the body; and
   cooling the body.

18. The method of making an expandable screen of claim 17, further comprising attaching the one or more strands to other of the one or more strands during the building of the body.

19. The method of making an expandable screen of claim 17, wherein the compacting is performed at strand temperatures below an actuation temperature of the shape memory material.

* * * * *